HIGHWAY PARTY LINE SYSTEM

Filed Sept. 29, 1961 3 Sheets-Sheet 1

INVENTORS W. G. HALL
A. A. ROETKEN
BY. [signature]
ATTORNEYS

Oct. 27, 1964 W. G. HALL ETAL 3,154,642

HIGHWAY PARTY LINE SYSTEM

Filed Sept. 29, 1961 3 Sheets-Sheet 2

INVENTORS W. G. HALL
A. A. ROETKEN
BY [signature]
ATTORNEY

Oct. 27, 1964 W. G. HALL ETAL 3,154,642

HIGHWAY PARTY LINE SYSTEM

Filed Sept. 29, 1961 3 Sheets-Sheet 3

INVENTORS W. G. HALL
A. A. ROETKEN
BY
ATTORNEY

United States Patent Office 3,154,642
Patented Oct. 27, 1964

3,154,642

HIGHWAY PARTY LINE SYSTEM

William G. Hall, Morris Township, Morris County, and Alfred A. Roetken, Madison, N.J., assignors to Bell Telephone Laboratories, Incorporated, New York, N.Y., a corporation of New York Filed Sept. 29, 1961, Ser. No. 141,691
8 Claims. (Cl. 179—17)

This invention relates to party-line telephone systems and more particularly to a system to be installed along a highway for use as an adjunct to a so-called radio personal signaling or alerting system.

The lack of frequency space and the resultant crowding of radio frequency channels results in the need for more mobile communication facilities than those available for the present two-way mobile radio-telephone service. A mobile communication system of a more limited nature than the aforementioned type comprises a base station radio transmitter and a plurality of personal signaling receivers, one of which is carried on the person of each customer desiring service. If someone wishes to contact the customer, a code signal individual to that customer is transmitted and operates the receiver to produce a tone thereby notifying the customer he is wanted. The customer is thereupon required to go to the nearest telephone and call into the base station operator who may connect him with the calling party via the regular telephone system or may inform him of the content of a message.

Although this device solves the communication problem in cities or towns or any place where access to a telephone is relatively easy, a problem is presented if the service is expanded to encompass interurban sites; i.e., if the customer happens to be on a highway between urban areas or on toll roads which are relatively devoid of telephones. When a customer at such locations is notified he is wanted, he must drive off the highway in search of a telephone. On the other hand, if the customer did not wish to drive off the road he would have to continue along the highway until he reached the next area which did contain telephone service facilities and thereby waste valuable time.

The cost of installing telephone booths along a highway is fairly considerable. Furthermore, if each station is given full access to the highway trunk group the resultant cost would be high because of the necessary installation of line finding equipment on a per station basis.

Thus it is an object of the present invention to reduce the complexity and cost of telephone facilities installed along the highway for use with radio personal signaling services.

It is a further object of the invention to accomplish such reduction of complexity without the deterioration of service which often accompanies the provision of minimal facilities.

The present invention contemplates that each personal signaling customer be equipped with a telephone which is adapted to be plugged into telephone jacks which are situated at convenient locations along a highway. Such locations are interconnected by a number of trunks and several jacks may be provided at each location. Each jack at a location is connected to a different trunk but each trunk is shared, on a party-line basis, by jacks at several locations. A detecting device comprising two square-loop magnetic cores which are threaded by at least three windings: an input winding, the trunk, and an output winding, is associated with each jack. When the telephone is inserted into the jack the detecting device will produce an output only if the trunk is idle. A further provision is made to illuminate a busy sign if the trunk associated with a particular jack is in use or, if all the jack stations at a single location are associated with busy trunks, to illuminate a larger location busy sign.

These and other features of the invention will become more apparent from the description below taken with the drawings in which.

Figure 2:
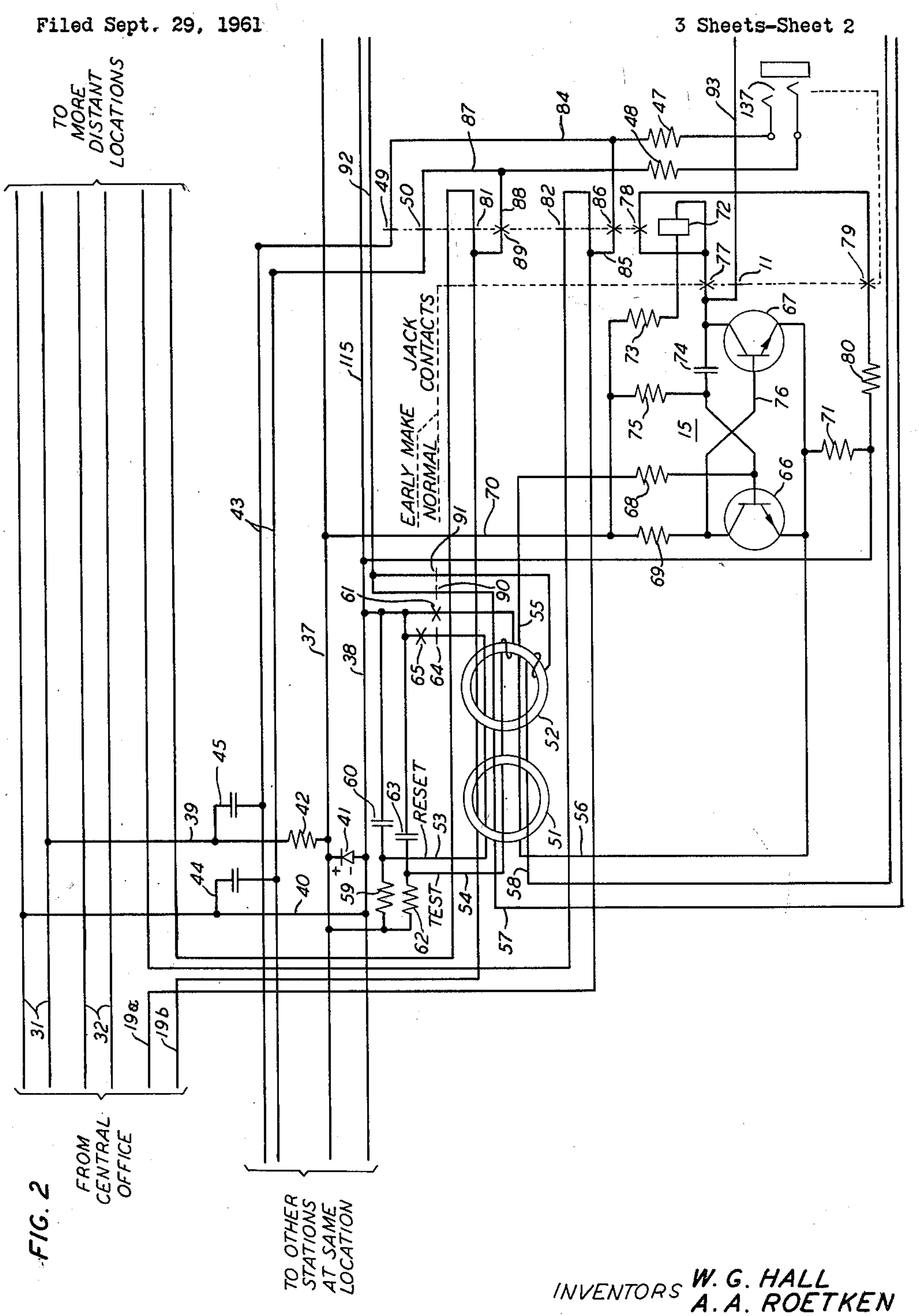
Figures 3, 4, 5:
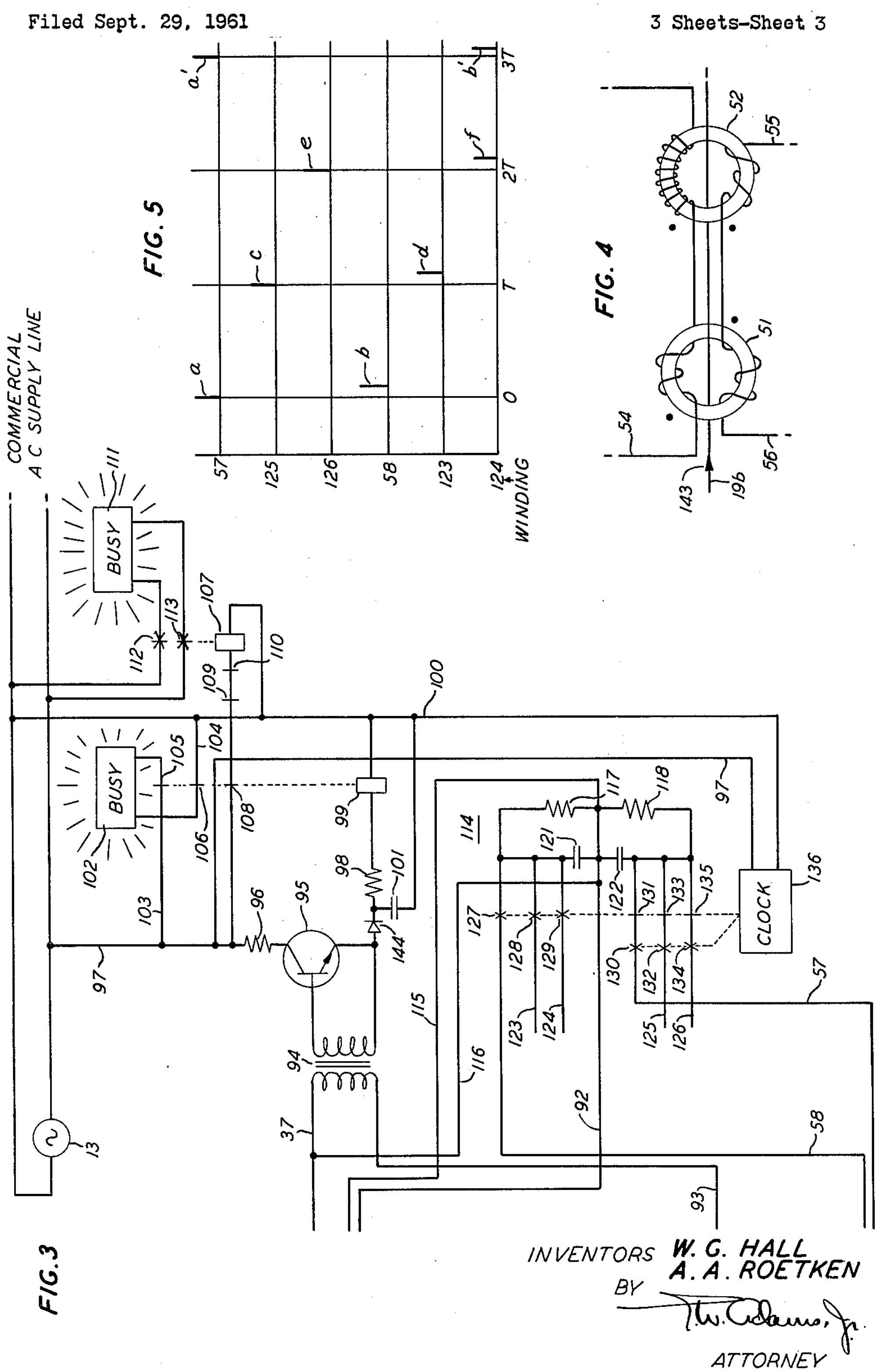

FIGS. 2 and 3 when placed together with FIG. 2 to the left of FIG. 3 comprise a schematic circuit diagram of a jack station for the telephone system of the invention;

FIG. 4 is a detailed view illustrating certain features of the magnetic detection device of the present invention; and FIG. 5 is a graph representing the action of the clock shown in FIG. 3 as a function of time.

Like numerals in the various diagrams indicate the same elements. A "make" contact, shown by a cross, indicates an open circuit which is closed when the relay coil is energized or a jack plug is inserted; a "break" contact indicates a closed circuit which is opened when the relay coil is energized or a jack plug is inserted and is shown by a line. The normal state of a contact or circuit refers to that state wherein the relay coil is not energized or the jack plug is not inserted.

According to the invention plural telephone lines or trunks are installed parallel to a highway. The present description contemplates the use of 11-pair wire; 6-pairs are to be used as trunks for carrying conversation while the remaining five pairs will carry the direct current supervisory and control potentials needed for the various operations outlined above. However, the number of pairs used is by way of example only and this invention is not to be limited to this number.

Figure 1A:
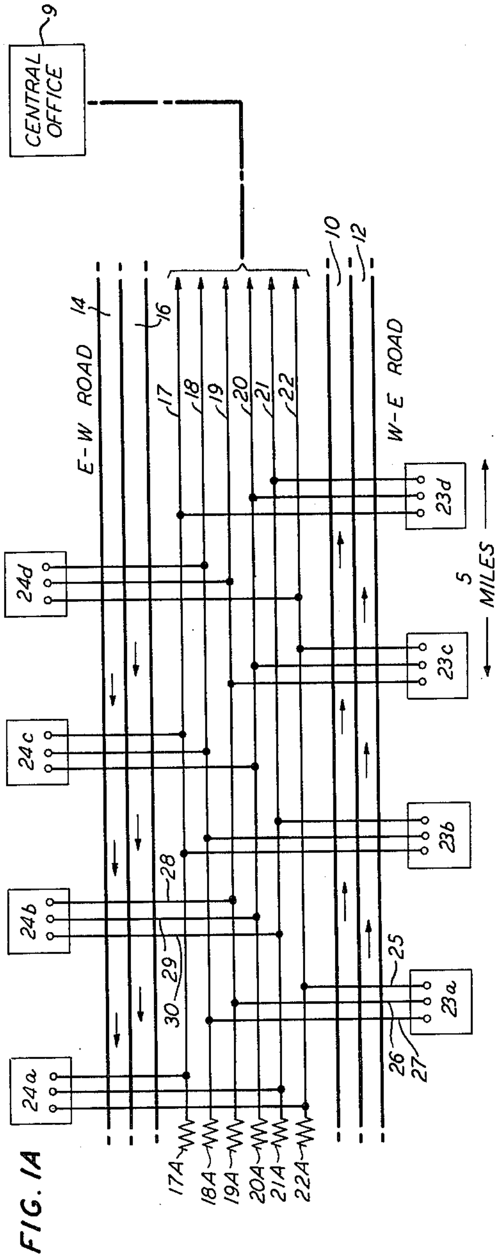
FIG. 1A is a diagrammatic representation of the telephone system of the invention as installed along a highway.

FIG. 1A shows how a 4-lane highway, including lanes 10 and 12 for carrying traffic from west to east and lanes 14 and 16 for carrying traffic from east to west, may be furnished with telephone service in accordance with the present invention. It is proposed to locate stations at five mile intervals along one side of the highway and at five mile intervals along the other side of the highway. The locations, however, will be staggered on each side of the highway. That is, any location along lanes 10 and 12 will be only 2½ miles away from any location along lanes 14 and 16. Each location will have access to three of the six conversation carrying trunk lines and the connections to these lines will be made through a telephone jack which will be set in a post at each location. Thus, the six trunks 17–22 as shown in FIG. 1A, will be installed generally parallel to the highway and each will be terminated at one end in impedances *17a*–*22a*, respectively, and each will be connected to central office 9 at the other end. Locations *23a*– *23d* are located on the west to east road and stations *24a*–*24d* are located on the east to west road.

A typical location, such as location *23a* may have three stations (or jacks) thereat connected to trunks 22, 19, and 18 by means of leads 25, 26, and 27, respectively. The next location along the highway, which will be location *24b*, will have jacks connected to trunks 19, 20, and 21 by means of leads 28, 29 and 30, respectively. It is to be noted that location *23b* affords connection to only one of the trunks (18) to which location *23a* allows access, while location *23c* does not connect to any of the trunks which service location *23b*. This arrangement limits the connection, if any, of adjacent locations along each direction of the highway to one common trunk. This will, in effect, allow a greater degree of access to the trunking facilities by the personal signaling system customer.

Figure 1B:
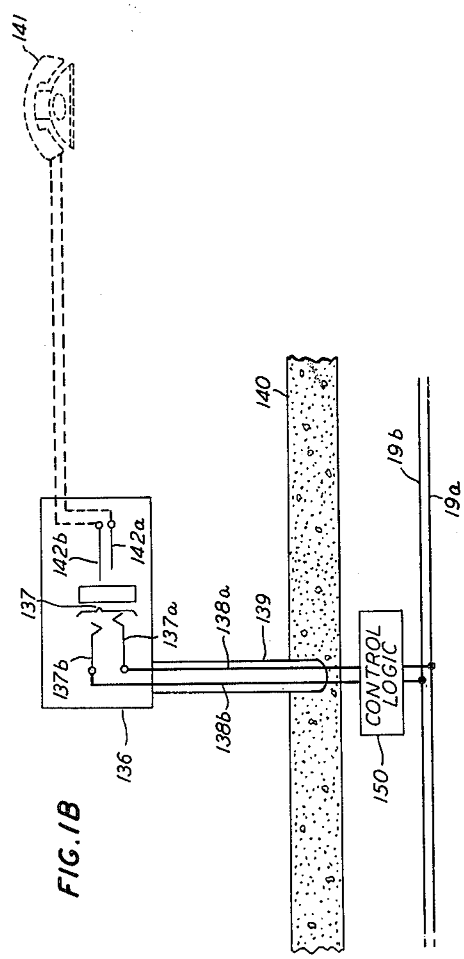
FIG. 1B is a diagrammatic representation of a jack installation.

FIG. 1B illustrates a typical installation at a highway location. A jack 137 having contacts 137a and 137b is set in a housing 136 and connects to leads 19a and 19b, which comprise trunk 19, by means of leads 138a and 138b, respectively. Housing 136 is firmly secured to hollow pipe 139 which is imbedded in the cement block 140. Thus, leads 138a and 138b run through the hollow pipe to make a connection to one of the trunk lines lying beneath the roadway. A telephone, such as 141, may be connected to jack contacts 137a and 137b by means of a plug having contacts such as 142a and 142b. The control logic is indicated generally as a box 150. The operation of 150 is fully explained with regard to FIGS. 2 and 3.

FIG. 2 shows the schematic circuit diagram of the control logic for the party line system. Since the implementation of each individual station is the same, the operation of only one station will be described. For the sake of clarity only a few of the aforementioned pairs of wires are shown, it being understood that the other pairs of wires will connect to the other stations in a like manner. Wire pairs 31 and 32 carry the direct current from the central office to operate the logic devices while the leads 19a and 19b comprise one of the conversation carrying trunks.

Wire pair 31 is connected to the leads 37 and 38 by leads 39 and 40, respectively. A Zener or avalanche diode 41 is connected between leads 37 and 38 and a resistor 42 is connected in lead 39. Diode 41 serves to regulate the direct-current potential which is distributed to the circuit elements by means of leads 37 and 38. Resistor 42 limits the current drawn by diode 41. A busy tone bus 43 is connected to the D.C. trunk 31 by capacitors 44 and 45 and leads 40 and 39, respectively. The capacitors prevent direct current from passing to bus 43 but will pass a busy tone which has been superimposed on direct-current trunk 31. Busy tone bus 43 is connected to telephone jack 137 through leads 84 and 87 which contain series resistors 47 and 48, respectively. Resistors 47 and 48 serve to make the loop loss uniform with respect to the subscriber. Contacts 49 and 50, of a relay 72, are connected in leads 84 and 87, respectively, and are normally in the closed position to connect busy tone bus 43 to the jack 137.

The control logic comprises magnetic cores 51 and 52 which exhibit a square-loop hysteresis characteristic. A number of windings thread these cores as follows: reset winding 53, test winding 54, lead 19b (which is one conductor of the aforementioned conversation carrying trunk pair), output windings 55 and 56 (which are connected together) and busy indicator windings 57 and 58. (Although many of these windings have been shown as leads passing through the cores, it is to be understood that these leads represent the actual windings which may be more than the one turn shown.) Winding 53 is connected to the junction of resistor 59 and capacitor 60 at one end and connected to line 38 through jack contacts 64 and 65 at the other end. Contacts 64 and 65 are normally in the closed and open positions, respectively. Winding 54 is connected to the junction of resistor 62 and capacitor 63 at one end and is connected to line 38 through contact 61, which is normally in the open position, at the other end. Resistors 59 and 62 are connected to line 37 and capacitors 60 and 63 are connected to line 38.

Windings 57 and 58 thread the cores 51 and 52 and are connected to lead 92 through contacts 90 and 91, respectively, which are normally in the closed position.

Output windings 55 and 56 are connected to monostable multivibrator 15 comprising, in part, transistors 66 and 67. Winding 55 is connected to the base of transistor 66 through resistor 68 and winding 56 is connected to the emitters of both transistors. The collector of transistor 66 is connected to lead 37 by lead 70 which includes a series resistor 69. Winding 56 is connected to lead 38 through a resistor 71. A series circuit comprising resistor 73, the winding of relay 72, jack contact 77, which is normally in the open state, and capacitor 74 is connected between lead 70 and the base of transistor 66. A resistor 75 is also connected between lead 70 and the base of transistor 66. Lead 76 connects the base of transistor 67 with the collector of transistor 66. The collector of transistor 67 is connected to the junction of capacitor 74 and contact 77. A relay holding circuit comprising the series circuit of contacts 78 and 79, which are normally in the open state, and a resistor 80 is connected between contacts 77 and relay winding 72 at one end, and line 38 at the other end. A lead 93 connects the collector of transistor 67 with the visual indicator circuit of FIG. 3 through jack contact 11, which is normally in the closed state, as noted hereinbelow.

Contacts 81 and 82 of relay 72, which are normally in the closed state, are connected in the conductors 19a and 19b, respectively, of conversation carrying trunk 19. Conductor 19a is connected to lead 84 by means of lead 85 which passes through relay contact 86. Conductor 19b of the trunk is connected to lead 87 through lead 88 which includes relay contact 89. Contacts 89 and 86 are normally in the open position. Relay 72 controls the action of contacts 78, 86, 82, 89, 81, 50 and 49 as indicated by the dotted line connecting these contacts as shown in FIG. 2. Jack 137 controls the action of contacts 79, 11, 77, 61, 64, 65, 90 and 91 as indicated by the dotted line connecting these contacts as shown in FIG. 2.

Contact 65 is denoted as an early make contact; i.e., when a plug is inserted into jack 137, contact 65 will be activated initially, thereafter the remainder of the contacts controlled by jack 137 will change states.

The visual busy indicator circuit is shown in FIG. 3 and connects to the leads 37, 38, 92, and 93 and windings 57 and 58 of FIG. 2. These connections may be clearly seen by placing FIG. 3 next to FIG. 2.

Lead 93, which is connected to the collector of transistor 67, as noted above, forms a part of the visual busy indicator circuit and connects to the primary of transformer 94, the other end of which is connected to lead 37. The secondary of transformer 94 is connected between the base and emitter of a transistor 95. The collector of transistor 95 is connected to one line of a commercial A.C. supply, shown schematically by generator 13, by lead 97 which contains a series impedance 96. The emitter of transistor 95 is connected to the other line of source 13 through the series circuit comprising diode 144, resistor 98, the winding of relay 99 and a lead 100. A capacitor 101 is connected between the junction of diode 144 and resistor 98 and lead 100. A station busy sign 102 is connected to the commercial line through leads 103 and 104 which connect to leads 97 and 100, respectively. Contact 105 and contact 106 of relay 99, which are normally in the closed state, are connected in leads 103 and 104, respectively.

The winding of a relay 107 is connected between leads 97 and 100 through contacts 108, 109, and 110 in series. The location busy sign 111 is connected to the commercial supply line through contacts 112 and 113 of relay 107, which are normally in the open position. Contacts 109 and 110 are each controlled by relays connected to each of the other stations at the location as described hereinbelow.

A pulse generator 114 is connected to the D.C. potential available on leads 38 and 37 (FIG. 2) through leads 115 and 116. Lead 115 is connected to the junction of resistors 117 and 118. Lead 116 is connected to lead 92 at the junction of capacitors 121 and 122. Windings 58, 123 and 124 are connected to the junction of capacitor 121 and resistor 117. Windings 57, 125, and 126 are connected to the junction of capacitor 122 and resistor 118. Each of the windings 58, 123, 124 service a different station at the location; each of the windings 57, 125, and 126 likewise service a different station at the location. Only windings 57 and 58 are shown in FIG. 2. Windings 58, 123, and 124 pass through normally open contacts 127, 128, and 129, respectively, and leads 57, 125, and 126 traverse early make contacts 130, 132, and 134, which are open in their normal state, and normally close contacts 131, 133, 135 respectively. These aforementioned contacts are controlled by clock 136 which is connected to the supply line by leads 100 and 97.

The operation of clock 136 will best be understood by reference to FIG. 5 wherein each lettered pulse will cause energy to be applied to the winding indicated at the left of the base line in the manner set forth hereinbelow. At zero time the clock will produce pulse *a* which will cause contact 130 to close thereby resetting the core by sending a pulse of energy through winding 57. A predetermined interval thereafter (<T) clock 136 will produce pulse *b* which will cause contact 131 to open and contact 127 to close thereby sending a pulse of energy through winding 58. A short time interval thereafter (<T) all contacts will return to their normal states. At time T the clock will produce pulse *c* which will close contact 132 and send a pulse of energy through winding 125. Thereafter pulse *d* will cause the simultaneous opening of contact 133 and the closing of contact 128 thereby sending a pulse of energy through winding 123 and thereafter all contacts will again return to their normal states. Likewise, at time 2T contact 134 will be activated by pulse *e* and a short time thereafter contacts 135 and 129 will be activated by pulse *f* thereby supplying energy to windings 126 and 124 in a like manner as noted above. At time 3T the cycle begins again as indicated by pulses *a'* and *b'*.

The operation of the system will now be considered with reference to the circuit of FIGS. 2 and 3 as discussed above. The value of the various currents noted below are typical values and the invention is not to be limited to such values since the current will be determined by the applied voltage and the impedance of the circuit. Likewise the amount of flux each winding contributes is for illustrative purposes only.

FIG. 4 shows an enlarged view of cores 51 and 52 with only test winding 54, trunk lead 19*b* and the output windings 55 and 56 thereon. It is to be noted that test winding 54 has three times as many turns on core 52 as it has on core 51. It is further to be noted that output windings 55 and 56 are joined in a bucking connection.

When a trunk is seized at a particular location, the remainder of the trunk from that location to the termination resistance will be disconnected, as explained hereinbelow, to avoid possible reflections and thereby reduce interference. The trunk may thus be in any one of three different states: In the idle state the termination resistance will cause the trunk to draw six milliamperes; when the trunk is being used the telephone will cause a current of 20 milliamperes to flow from the central office to the station being used; in the third state the trunk will be disconnected and therefore no current will flow.

Assuming the trunk is idle, six milliamperes will be flowing through lead 19*b* in the direction shown by arrow 143 and thus set up a magnetomotive force of six milliampere-turns, thereby setting the cores in a state which we may arbitrarily select as being zero. If a one milliampere pulse is applied to winding 54, the winding will produce a magnetomotive force of three milliampere-turns on core 51 and will produce a magnetomotive force of nine milliampere-turns on core 52. Thus core 52 will change its state to the one state and the change in flux will cause an output at output winding 55 which will thereby cause multivibrator 15 (FIG. 2) to change states.

Assuming the trunk is busy and there is no current flowing through the trunk winding, the trunk winding will contribute zero milliampere-turns and both cores will change states when a pulse is applied to winding 54. However, since the output coils 55 and 56 are in a bucking remainder of the trunk from that location to the termina- Assuming the trunk is busy and that there are 20 milliamperes flowing through trunk lead 19*b*, the trunk will contribute a magnetomotive force of 20 milliampere-turns. Thus, there will be no change of state of the cores when a bias is applied to winding 54 as the maximum milliampere-turns applied will be to core 52 and is nine milliampere-turns; there will be no change of state of the flux in the cores and no output will result.

The operation of the over-all system will now be discussed for two cases: (1) When the trunk is idle and (2) when the trunk is busy.

*When Trunk Is Idle*

Clock 136 will initially cause a pulse to be sent through winding 57, by closing contact 130 as noted hereinabove. This will set the cores 51 and 52 (FIG. 2) in a zero state. Thereafter the clock will activate break contact 131, at the same time, clock 136 will cause contact 127 to close thereby causing a bias to be applied to the cores through winding 58 in the manner set forth above. This winding and windings 123 and 124 are wound in a direction opposite to the direction of their counterpart windings 57, 125 and 126 and like winding 54 and will tend to set the cores in the one state. If the trunk is idle a pulse will appear at the output winding 55 and 56 of the cores, as noted hereinabove, thus placing a negative bias on the base of transistor 66 and driving 66 into cut off, thereby causing monostable multivibrator 15 to change state. This will cause an output to appear on lead 93 which will be applied to the base of transistor 95 through transformer 94. (It is to be noted that relay 72 will not be energized at this time as contact 77 will be open.) Transistor 95 will be brought out of cut off and will conduct current during the time interval that a positive potential is placed on lead 97 by generator 13. Therefore current will flow through the winding of relay 99 which will keep contacts 105, 106, and 103 open and thus prevent busy signs 102 and 111 from lighting. Capacitor 101 will charge up when transistor 95 conducts and will discharge through resistor 98 and the winding of relay 99 during the periods transistor 95 does not conduct since diode 144 prevents discharging through any other part of the circuit. Thus a current will be maintained through the winding of relay 99 during the periods between succeeding pulses.

When a personal signaling system customer decides to use one of the stations he stops his car at a location and connects the plug into jack 137. This will initially close contact 65 and cause capacitor 60 to discharge thereby sending a pulse through winding 53 to set the cores to their zero state. Thereafter the telephone jack will close contacts 79, 77, and 61 and open contacts 11, 90, 91, and 64. Contacts 90 and 91 will disconnect windings 57 and 58, respectively, from pulse generator 114. Furthermore now open, contact 11 will prevent any pulses from reaching transformer 94. Thus the visual busy indicating circuit will be effectively disconnected from the monitoring circuit.

The closing of contacts 77 and 79 will connect relay 72 to the output of multivibrator 15. Contact 64 will disconnect reset winding 53 from condenser 60 but contact 61 will now allow condenser 63 to discharge through test winding 54. The direction of current in this winding will tend to set the cores into the one state. Thus an output will appear, as noted above, since only six milliamperes are flowing through the trunk winding. This will cause the monostable multivibrator 15 to change states thereby activating relay 72.

Relay 72 will close contacts 78, 86, and 89, and at the same time open contacts 82, 81, 49, and 50. A holding path about the relay will be established to prevent the relay from releasing after the mulivibrator returns to the normal state. The holding circuit will be from line 37 through resistor 73, the winding of relay 72, contact 78, contact 79, and resistor 80 to line 38. Contacts 49 and 50 will disconnect busy tone bus 43 from leads 84 and 87. Contacts 82 and 81 will disconnect the portions of trunk conductors 19*a* and 19*b*, respectively, extending from this station to the terminations. Furthermore, by the closing of contacts 86 and 89, leads 85 and 88 will connect jack leads 84 and 87, respectively, to the conversation-carrying trunk pair 19*a* and 19*b*, respectively, thereby connecting the customer to the trunk line.

Since no pulses are applied to the base of transistor 95 the emitter-base bias will be zero and the transistor will be cut off thereby preventing any current from flowing through diode 144 to charge condenser 101. Thus, the charge on 101 will leak off through relay 99 causing relay 99 to release contacts 103, 106, and 105 and thereby causing station busy signal 102 to illuminate to notify customers that this station is in use. Contacts 109 and 110 are each controlled by the relays of the other two stations at the location. Thus, if each station is being used at a location contacts 103, 109, and 110 will complete the circuit from lead 97, through relay 107 and lead 100, which will thereupon cause the location busy signal 111 to be illuminated by causing contacts 112 and 113 to close. Thus a customer driving along need not stop at a location which has the busy sign 111 illuminated since this will indicate that all stations at that location are in use.

*When Trunk Is Busy*

If the trunk is busy either 20 milliamperes or zero milliamperes will be flowing through the trunk winding, as noted hereinabove. With zero current flowing through the trunk winding and no plug inserted into jack 137 (FIG. 2) the pulses caused by clock 136 and pulse generating apparatus 114 will produce no output at the output windings 55 and 56. That is, the first pulse will reset the core to zero and the second pulse will change the state of the cores but the output windings are in a bucking arrangement and therefore the total output will be zero. The mutivibrator 15 will not change states and no pulse will appear between the base and emitter of transistor 95. This will cause relay 99 to release and illuminate busy sign 102.

Likewise, if 20 milliamperes are flowing through the trunk winding indicating a busy trunk, windings 55 and 56 will produce no output, as noted hereinbefore, and will again cause illumination of busy sign 102. Thus the busy sign will be illuminated at all locations which that particular trunk services to notify the customer who may wish to use this particular trunk that it is in use.

If a customer inserts a jack into receptacle 137 and the trunk happens to be in use, no output will appear at output windings 55 and 56. Thus, relay 72 will not be activated since multivibrator 15 does not change states and contacts 49, 50 will remain in their normal closed state and contacts 86, 89 will remain in their normal open state thereby keeping the jack leads connected to the busy tone bus and disconnected from the trunk. The customer will hear a busy signal and will be prevented from hearing the conversation in progress on the trunk.

What is claimed is:

1. A party-line telephone system comprising a plurality of trunk lines each interconnected between a central office and terminating impedance, a busy tone bus, and access means connected to each of said plurality of trunks and adapted to connect a plurality of telephones to each trunk, means connecting the busy tone bus to said access means, detection means connected to each of said access means to detect the condition of said trunk, a source of pulsating energy connected to each of said detection means, said detection means comprising two cores exhibiting a square-loop hysteresis characteristic and having an input winding connected to the source of pulsating energy, a trunk winding connected to said trunk, and output windings, said input winding having a different number of turns on each core to thereby produce an output pulse at said output windings when said trunk is in a first state, and a second means connected to said output windings to thereby disconnect said busy tone bus from said access means when an output pulse appears at the output windings.

2. In a party-line telephone system comprising a plurality of trunk lines each interconnected between a central office and a terminating impedance, a busy tone bus, and access means connected to each of said plurality of trunks and being adapted to connect a plurality of telephones to each trunk, means connecting the busy tone bus to said access means, a detection means and a monostable device connected to each access means, said detection means being adapted to monitor the condition of said trunk, said detection means comprising two cores exhibiting a square-loop hysteresis characteristic and having an input winding connected to the source of pulsating energy, a trunk winding connected to said trunk, and an output winding, means connecting said output winding to said monostable device, and a relay means connected to said monostable device and being adapted to disconnect said busy tone bus and the remainder of the trunk when a telephone is connected to said access means and an output pulse appears at said output windings.

3. A party-line telephone system as defined in claim 1 including a pulse generating means and a visual indicator, said pulse generating means being connected to said detector means and being adapted to change the direction of flux in said core when said trunk is in said first state, said visual indicator means being connected to said second means and being adapted to be illuminated when said trunk is in use.

4. In a limited access party-line telephone system having at least one trunk connected between a central office and a terminating impedance, a pulse generating means, and a plurality of first means adapted to connect a plurality of telephones to said trunk, a detection means, a source of pulsating energy, a monostable device, a visual indicator and a transistor associated with each of said plurality of first means, said detection means comprising two magnetic cores having an input winding connected to the source of pulsating energy, a trunk winding connected to said trunk, and an output winding, said input winding having a different number of turns on each core to thereby produce an output pulse at said output winding when said trunk is in a first state, a fourth winding, means connecting said fourth winding to said pulse generating means, said fourth winding producing an output pulse at said output winding when said trunk is in a first state and no telephone is connected to said first means, means responsive to said output pulse and being connected to said transistor to thereby bias said transistor into conduction, and means connecting said visual indicator and said transistor and being adapted to illuminate said visual indicator when no output pulses appear at said output windings.

5. In a party-line system having at least one trunk connected between a central office and a terminating impedance, a plurality of first means spaced at various locations along said trunk and being adapted to connect a telephone to said trunk, a busy tone bus, first contact means being adapted to connect and disconnect the busy tone bus to said first means, second contact means capable of connecting and disconnecting the trunk to said first means, a source of pulsating energy and a detection means at each location, said detection means comprising two cores exhibiting a square-loop hysteresis characteristic and having an input winding connected to said source of pulsating energy, a trunk winding connected to said trunk, and an output winding, said input winding having a different number of turns on each core to thereby produce an output pulse at said output winding when said trunk is in a first state, pulse generating means, a fourth winding, and means capable of connecting and disconnecting said fourth winding to said pulse generating means, a monostable device, a second means connecting said output winding to said monostable device, a relay means, and a third means capable of connecting and disconnecting said relay means to said monostable device, a visual indicator, and a fourth means being adapted to connect and disconnect the visual indicator to said monostable device, said third and fourth means being actuated when a telephone is connected to said first means, said relay means adapted to actuate said first contact means to disconnect said busy tone bus and said second contact means to connect said trunk when an output appears at said output winding and a telephone is connected to said first means, said third means connecting said relay means to said monostable device and said fourth means disconnecting said visual indicator when a telephone is connected to said first means.

6. In a party-line telephone system including at least one trunk connected between a central office and a terminating impedance, a busy tone bus, a pulse generating means, and a plurality of access means spaced at various locations along said trunk and being adapted to connect a telephone to said trunk, detection means, a source of pulsating energy, a monostable device, and a relay associated with each location, said detection means comprising two cores exhibiting a square-loop hysteresis characteristic and having an input winding, a trunk winding connected to said trunk, an output winding connected to said monostable device, and a fourth winding, a first means being capable of connecting and disconnecting said input winding to said source of pulsating energy, a second means being capable of connecting and disconnecting said relay to said monostable device, said first and second means being controlled by said access means, contact means being capable of connecting and disconnecting said busy tone bus to said access means, a third means being capable of connecting and disconnecting said trunk to said access means, a fourth means being capable of connecting and disconnecting said pulse generating means to said fourth windings, said third means being controlled by said relay means, said relay means actuating said contact means to disconnect said busy tone bus and connect said trunk to the access means when an output appears at said output winding and a telephone is inserted into said first means, said source of pulsating energy being connected to said input winding when a telephone is connected to said access means.

7. A party-line system including at least one trunk connected between a central office and a termination, means for connecting a plurality of telephones to said trunk at spaced locations, the current in said trunk at any one of said locations being of a low value when a telephone is connected to said trunk at a location between said one location and said central office and of a high value when a telephone is connected to said trunk at a location between said one location and said termination, means connected to said trunk at said termination for causing said trunk to have a current intermediate said high and low values when no telephone is connected to said trunk, and means at each location for determining when the current is of said high, low or intermediate value and for indicating a busy condition at any one location when the current is of said high or low value and for completing a connection between said trunk and a telephone at any one location when the current is of said intermediate value.

8. A party-line system including a plurality of trunks each interconnected between a central office and a termination, means for connecting a plurality of telephones to each of said trunks at spaced locations, the current in any one of said trunks at any one of said locations being of a low value when a telephone is connected to said one trunk at a location between said one location and said central office and of a high value when a telephone is connected to said one trunk at a location between said one location and said termination, means connected to each of said trunks at said termination for causing each of said trunks to have a current intermediate said high and low values when no telephone is connected to the trunk, and means at each of said locations for indicating a busy condition of a particular trunk when the current is said particular trunk is of said high or low value and for completing a connection between said particular trunk and a telephone at any one of said locations when the current in said particular trunk is of said intermediate value.

References Cited in the file of this patent

UNITED STATES PATENTS

| | | |
|---|---|---|
| 1,061,589 | Beeler | May 13, 1913 |
| 1,576,814 | Dunbar | Mar. 16, 1926 |
| 1,864,646 | Edwards | June 28, 1932 |
| 2,025,444 | Crowe | Dec. 24, 1935 |
| 2,133,814 | Halligan | Oct. 18, 1938 |
| 2,180,963 | Pearce | Nov. 21, 1939 |
| 2,685,616 | Pharis | Aug. 3, 1954 |
| 2,967,212 | Burstow et al. | Jan. 13, 1961 |